July 3, 1962 C. THUMIM 3,042,760
CABLE CARRIER FOR PHOTOELECTRICALLY CONTROLLED
PAPER CUTTING MACHINES
Filed March 24, 1959 4 Sheets-Sheet 1
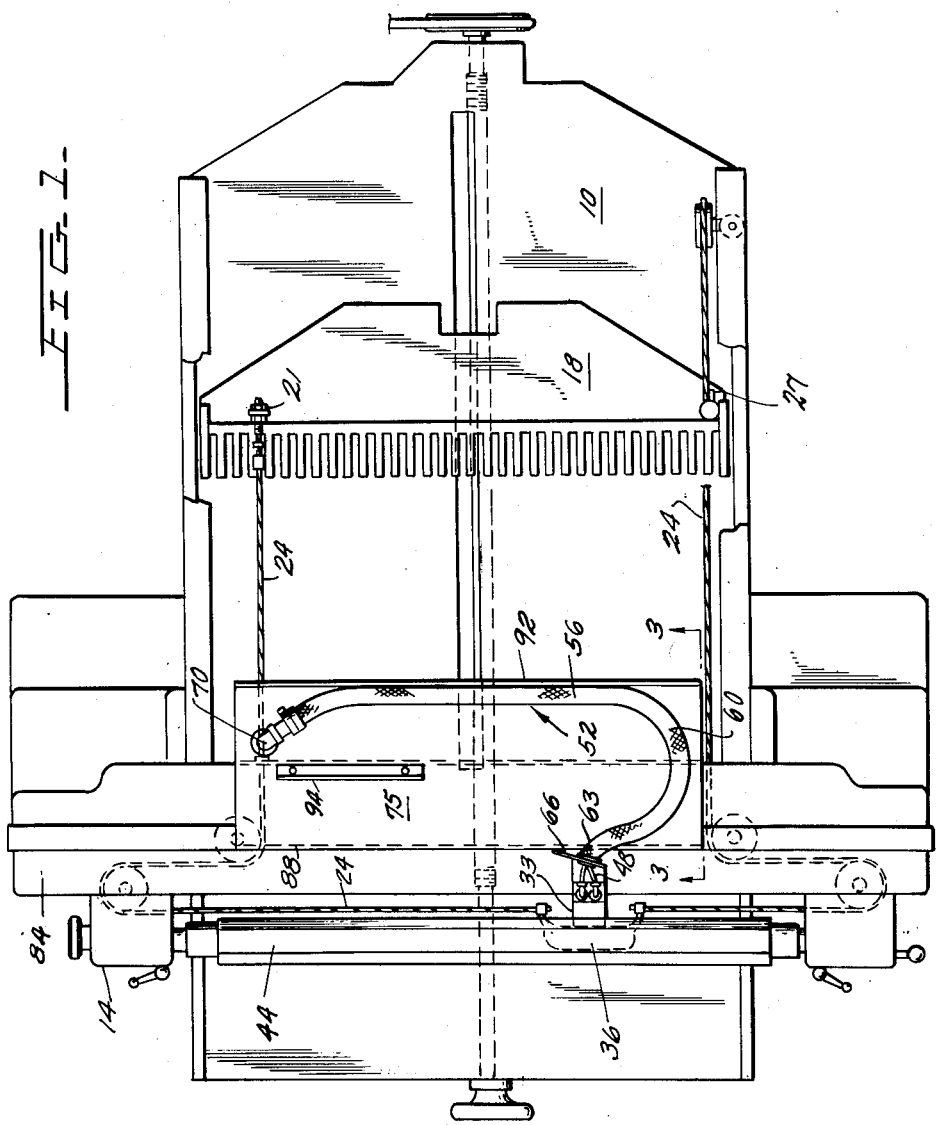
INVENTOR.
CARL THUMIM
BY
ATTORNEYS

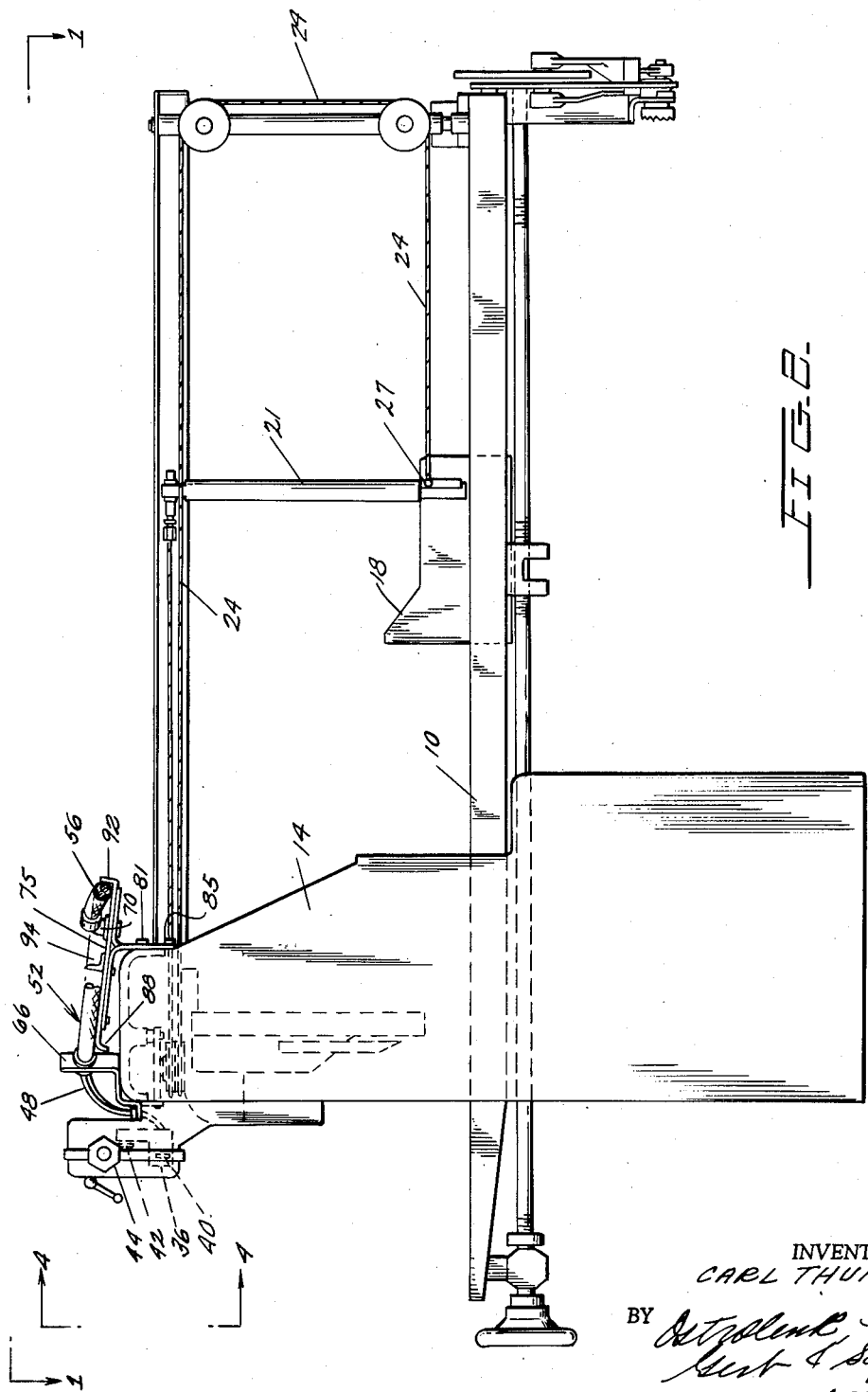

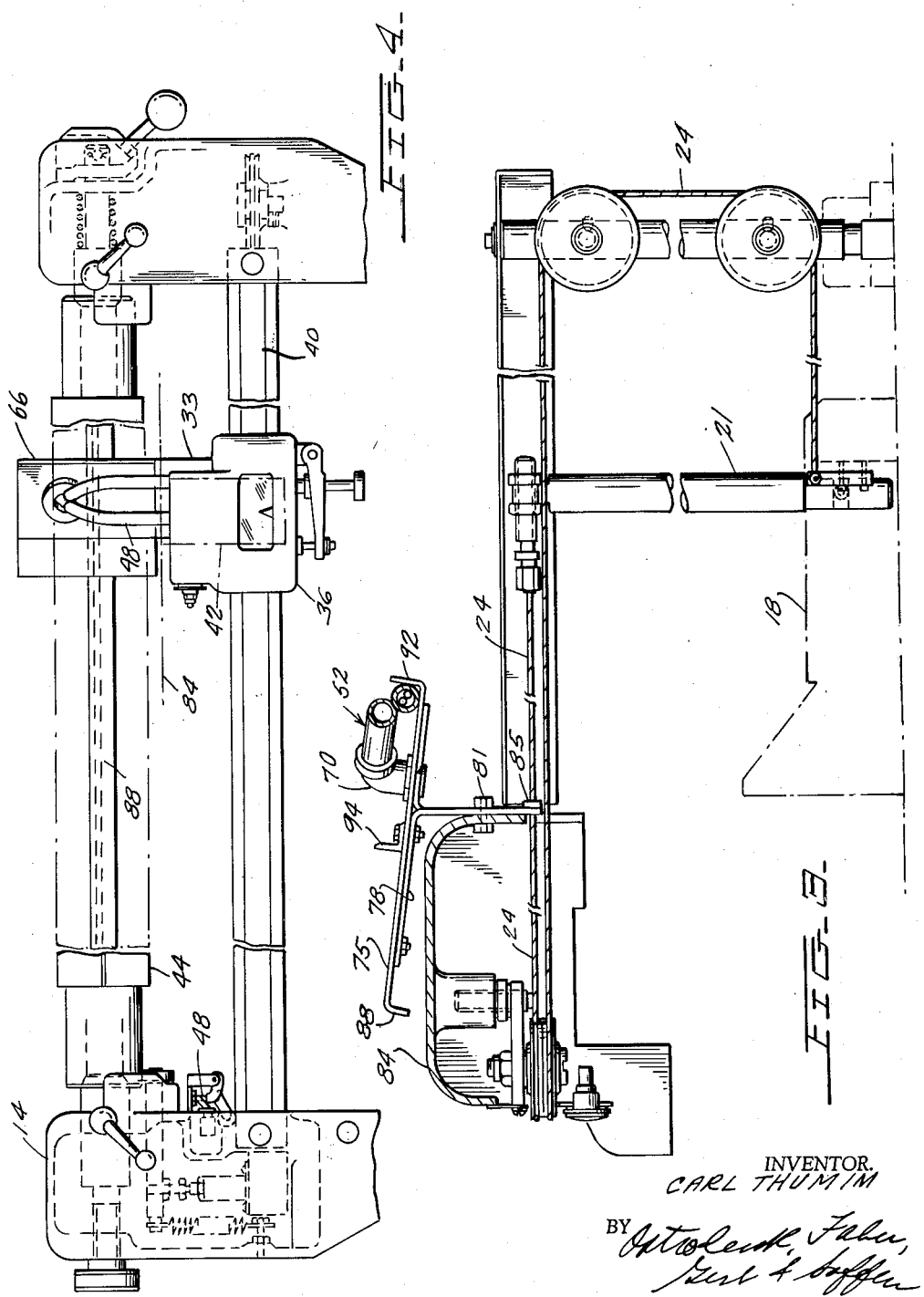

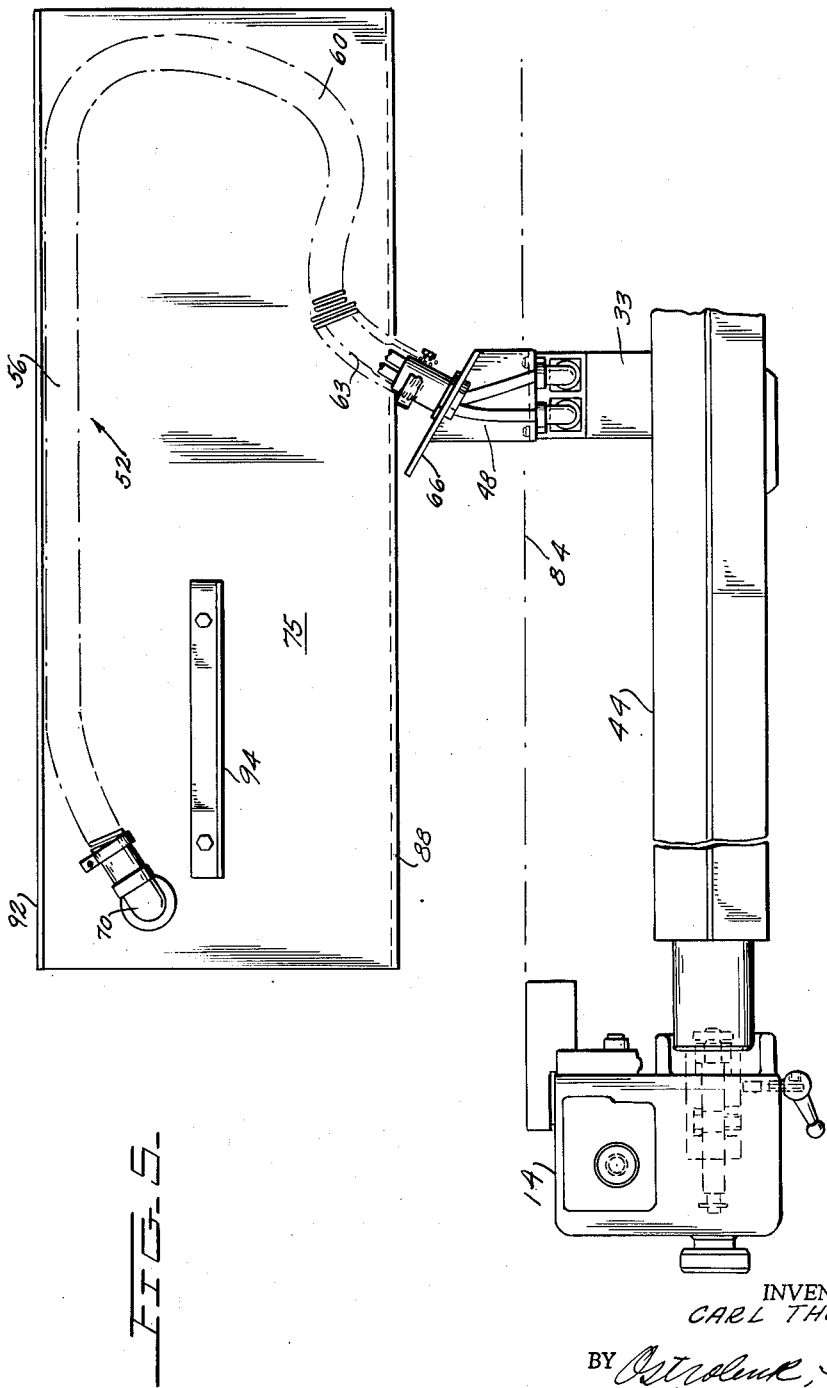

United States Patent Office 3,042,760
Patented July 3, 1962

3,042,760
CABLE CARRIER FOR PHOTOELECTRICALLY CONTROLLED PAPER CUTTING MACHINES
Carl Thumim, Westbury, N.Y., assignor, by mesne assignments, to Miehle-Goss-Dexter, Inc., Chicago, Ill., a corporation of Delaware
Filed Mar. 24, 1959, Ser. No. 801,489
4 Claims. (Cl. 191—12)

This invention relates to paper cutting machines and more particularly to automatically controlled back gauge paper cutting machines of the type having electrical sensing means such as electric switches or a photoelectric cell which travel transversely across the front of the machine and to which component electrical connections must be made.

One of the problems in conjunction with cutting machines of the photoelectrically controlled type such as shown in Seybold et al. Patent No. 2,737,158, owned by the present assignee is the mode of connection to the travelling photoelectric component which component comprises a light source and a photoelectric cell. Such component traverses the width of the machine and senses opaque signals, predeterminedly spaced, so as to interrupt the light beam. This is for the purpose of bringing the knife down at particular points on a paper pile for desired lengths of cut. The mode of operation is explained in considerable detail in the aforementioned patent, and accordingly no additional explanation need be given here, except to point out the necessity for connecting conductive wires or leads to the photoelectric component. Such conductors must travel with the component and have heretofore presented a problem because of the clearance required in the design of the machine, so as not to impede movement of the conductors, and also because anything which might block the motion of the conductors could cause breakage. Further, there was always the danger of the conductor becoming tangled or fouled under various operating conditions.

Accordingly, it is an object of the present invention to present a device in the form of a cable carrier which will form a support for the conductors while at the same time permit all required bending thereof in following the traverse of the photoelectric component.

It is another object of the invention to provide a cable device of simple and rugged construction and one which can be readily applied to existing machines of the general type described in the aforementioned patent.

Briefly, my invention comprises a stationary shelf disposed parallel to the path of traverse of photoelectric component, on which shelf a flexible cable is supported. The flexible cable is carried in a loop on the shelf and has one end secured to the shelf and the other end secured to the carrier of the photoelectric component. The cable is arranged in a single, more or less U-shaped bend or loop having generally parallel legs aligned in the longitudinal direction of the shelf, and thus in the direction of motion of the photoelectric component. Accordingly, as that component reciprocates across the front of the machine, the loop of cable has a flexing action so that the bend in the loop traverses the support shelf but never leaves the shelf, being supported thereon at all times. The arrangement thus avoids any possibility of fouling of the cable while at the same time providing as much support for the cable as possible.

A detailed description of my invention will now be given in conjunction with the appended drawing, in which:

FIGURE 1 shows a plan view of a paper cutting machine with the cable carrying shelf applied thereto.

FIGURE 2 is an elevation of the machine showing the position of the cable carrying shelf.

FIGURE 3 is a magnified portion of FIGURE 2 showing the mode of attachment of the shelf.

FIGURE 4 is a fragmentary front view showing the disposition of the shelf with respect to the photoelectric component carrier; and FIGURE 5 is a plan view somewhat similar to FIGURE 1 but on a magnified scale to more clearly disclose the details of the invention.

Referring now to the drawing and in particular to FIGURES 1 and 2, a guillotine type of paper cutting machine is illustrated having a table 10, a frame 14, and a back gauge 18. The back gauge 18 carries posts such as 21 to the upper end of which are secured the respective ends of cables such as 24, which, in conjunction with a pulley system and circuitous routing back to attachment at 27 with the back gauge, will be understood to effect reciprocation of a photoelectric component carrier bracket 33 slidably supported on a fixed bar 44. The details of the cable actuating system for the carrier bracket 33 need not be explained in detail herein, inasmuch as they do not form part of the present invention and inasmuch as disclosure thereof is generally made in the aforementioned Patent No. 2,737,158. The carrier 33 supports and carries the electric sensing component 36 (FIGURE 4) which is operative on photoelectric principles and will be understood to comprise a source of illumination spaced from a photoelectric cell, co-acting with opaque signal elements such as 42 (shown on phantom) adjustably carried on the hexagonal bar 44 for the purpose of controlling knife cutting movement in accordance with predetermined positions of the back gauge, all as set forth in the aforementioned Patent No. 2,737,158.

In order to make electrical connections with the photoelectric component, conductors such as 48 must terminate thereat and move therewith. Thus, a cable comprising such conductors are carried in a flexible, hose-like tube 52, which tube is spirally wrapped with spring wire 56. The individual coils of the spring wrapping are suitably spaced so as to permit full flexibility of the tube. The main purpose of spring 56 is to provide a wear proof coating. Rubbing naked cable on a steel plate will soon wear through the insulation. The spring temper wire is hard and therefore can take a great deal of rubbing without wearing through. Thus, the tube is formed in a U-shaped loop or bend 60 and constantly flexes as the loop traverses back and forth with the carrier bracket 33. In order to achieve this effect, one end 63 of the tube is fastened to an upright flange 66 which is integral with the carrier bracket 33. The other end is provided with a suitable fitting 70 and secured near an edge of the shelf 75. As seen on FIGURE 4, the conductors 48 come down from the fitting 70 (not shown on FIGURE 4) for connection in a control circuit support. The shelf 75 is fastened by means of an angle 78 and bolts 81, one bolt being shown in FIGURE 3, to a housing portion 84 of the machine. The shelf is mounted so as to have a downward slope toward the rear as shown in FIGURES 2 and 3. It will be noted that the angle element 78 is suitably bushed at 85 to permit passage of cables such as 24.

The forward edge 88 of the shelf is bent downwardly so as to preclude any danger of sharpness in contact with tube 52. The rear edge 92 of the shelf is bent upwardly so that the cable can rest against it and also to prevent the cable from leaving the shelf rearwardly due to the downward slope.

In order to insure against any possibility of fouling of the cable, a piece of angle iron 94 is bolted as shown (FIGURES 3 and 5) to maintain the two reaches of the tube separate from each other at that point where the legs of the U-shaped configuration of the tube are closest to each other.

By providing a downward slant rearwardly for shelf 75, the traverse of the carrier bracket 33 must effect a certain amount of definite pull on the tube in order to flex the tube for following the movement of the photoelectric component. Thus, there is no danger of the end 63 of the tube being influenced by gravity between the forward edge 88 of the shelf and the travelling carrier bracket 33.

I have found as a matter of practice that the simple expedient of providing the support shelf 75 in conjunction with the conductor carrying tube 52 is an effective and simple solution to the otherwise troublesome problem heretofore encountered in connection with making electrical connections to the photoelectric component. Thus, the shelf 75 fully supports the conductor carrying tube 52, which tube is flexed constantly as it moves, the negative tilt of the shelf preventing the tube from sliding beyond the forward edge, while the resilient spring winding around the tube serves as a stiffening means to effect a return force on the tube which tends to keep it on the shelf at all times.

While I have illustrated only one embodiment of the invention, it will be apparent that variations are possible and, accordingly, I do not seek to be limited to the precise illustration herein given except as set forth in the appended claims.

I claim:

1. In a paper cutting machine having an electric control circuit comprising an electric sensing component mounted for reciprocal traverse, a flexible conductor means for connecting to said component, and a stationary shelf for supporting said flexible conductor means as said component reciprocates, said shelf having an edge adjacent and generally parallel to the path of traverse of said sensing component, said conductor means being disposed in a tubing substantially fully supported on said shelf, said conductor means being secured at one end to said component, the other end of said conductor means being secured to said shelf, there being a generally U-shaped bend in said conductor means wherein said conductor means continually flexes to effect traverse of said U-shaped bend on said shelf as said component moves, said conductor being supported substantially throughout its length on said shelf at all times.

2. In a paper cutting machine having an electric control circuit comprising an electric sensing component mounted for reciprocal traverse, a flexible conductor means for connecting to said component, and a stationary shelf for supporting said flexible conductor means as said component reciprocates, said shelf having a forward edge adjacent and generally parallel to the path of traverse of said sensing component, said flexible conductor means having a wear-resisting flexible cover, said shelf being mounted to slope downwardly in the direction in which it recedes from the path of traverse of said component, the angle of slope being limited so that the conductor is substantially supported against gravity by said shelf, said conductor being supported for substantially its full length by said shelf at all times.

3. In a paper cutting machine having an electric control circuit comprising an electric sensing component mounted for reciprocal traverse, a flexible conductor means for connecting to said component, and a stationary shelf for supporting said flexible conductor means as said component reciprocates, said shelf having a forward edge adjacent and generally parallel to the path of traverse of said sensing component, said flexible conductor means having a wear resisting flexible cover, said conductor means being disposed in a tubing substantially fully supported on said shelf, said conductor means being secured at one end to said component, the other end of said conductor means being secured to said shelf, there being a generally U-shaped bend in said conductor means wherein said conductor means continually flexes to effect traverse of said U-shaped bend on said shelf as said component moves, said shelf being mounted to slope downwardly in the direction in which it recedes from the path of traverse of said component, the angle of slope being limited so that the conductor is substantially supported against gravity by said shelf, said conductor being supported for substantially its full length by said shelf at all times.

4. In a machine having a movable, electrical component comprising a current requiring device wherein said component reciprocates in a predetermined path, a flexible conductor means having one end connected to said component, and a stationary shelf for supporting said flexible conductor means as said component reciprocates, said shelf having an edge adjacent and generally parallel to the path of traverse of said component, the other end of said flexible conductor means being secured to said shelf, there being a generally U-shaped bend in said conductor means wherein said flexible conductor means continually flexes to effect traverse of said U-shaped bend on said shelf as said component moves, said flexible conductor means being supported substantially throughout its length on said shelf at all times.

References Cited in the file of this patent

UNITED STATES PATENTS

| 2,426,502 | Haupt | Aug. 26, 1947 |
| 2,737,158 | Seybold et al. | Mar. 6, 1956 |
| 2,865,979 | Klassen | Dec. 23, 1958 |

FOREIGN PATENTS

| 817,159 | Germany | Oct. 15, 1951 |
| 945,359 | Germany | July 5, 1956 |
| 819,862 | Great Britain | Sept. 9, 1959 |
| 328,131 | Great Britain | Apr. 24, 1930 |